United States Patent Office 3,592,747
Patented July 13, 1971

3,592,747
METHOD OF FORMING A DECORATIVE AND PROTECTIVE COATING ON A SURFACE
Charles C. Cohn, Atlantic City, N.J., assignor to Samuel L. Cohn & Charles C. Cohn, copartners trading and doing business as Colonial Alloys Company, Philadelphia, Pa.
No Drawing. Filed Aug. 17, 1966, Ser. No. 572,916
Int. Cl. C23f *17/00;* B23b *15/04;* C23c *1/08*
U.S. Cl. 204—38R                    12 Claims

ABSTRACT OF THE DISCLOSURE

Process of forming on a surface a decorative coating resistant to corrosion and abrasion which comprises forming a loosely adherent porous film of particles on the surface, applying a silicate solution to the film coated surface, drying the silicate-film coating and heating the dried silicate-film coating to insolubilize the silicate.

---

This invention relates to a decorative and protective coating on a surface and a method of forming a decorative and protective coating on a surface. The coating of the invention is resistant to both corrosion and abrasion.

The invention employs a loosely adherent porous film of particles hereinafter referred to as a "LAP" film for the sake of brevity. "Loosely adherent" as used herein means the particles continue to adhere to a substrate when subjected to the application thereto of the silicate solution employed in the invention (detailed later) but readily removed by wiping with a rag. The term porous is intended to mean that the particles do not form a truly continuous film but have spaces between them for the passage of the silicate solution.

It is well-known to those skilled in the metal finishing art that numerous processes employed to treat metal surfaces form an unwanted LAP film on the metal surface. LAP films are well-known in the metal finishing art as being formed, for example, by etching or pickling processes. Heretofore, the non-adherent character of LAP films and their lack of resistance to corrosion has made them simply an expensive nuisance since, when formed, they of necessity were removed for all commercial purposes.

As contrasted to paint or other color coatings, the coating of this invention provides color coating with a very thin film of the order of under 1 mil in thickness since the initial LAP film provides a very high concentration of covering material in a very thin film. In many cases, the coating of the invention is of the order of 100 microns or less. Paint films of comparable coverage of necessity are relatively thick due to the relatively small concentration of pigment in a paint vehicle. The film of the invention is far superior to paint or the like with respect to heat resistance and abrasion.

Briefly, the method of the invention involves forming a LAP film on the substrate surface to be coated, applying a silicate solution to the LAP film covered surface, drying the silicate solution at a temperature below the boiling point of the solution which is slightly over 100° C. to avoid ebullition, preferably at a temperature under 100° C., and then heating to substantially insolubilize the silicate. The heating is carried out above the boiling point of the silicate coating to drive off sufficient water of hydration to provide substantial water insolubility in the manner well known to the art. The conditions involved are referred to in greater detail hereafter. It appears that the LAP film particles become individually coated with silicate which results in the particles being cemented together and to the substrate on heating giving each particle a higher degree of corrosion and abrasion resistance. Further, the particle-silicate mass becomes strongly bonded to the substrate surface by virtue of the porosity of the LAP film permitting silicate to thoroughly penetrate to the substrate surface. The overlying silicate coating provides an attractive glaze, though where a metal substrate is attacked the finish may be dull, with good abrasion resistance as well as good resistance to acid and alkali corrosion. Thus, not only does the generally unwanted LAP film now form a part of a useful coating, but also the coating has an unexpectedly high resistance to abrasion and corrosion in ordinary use.

The coating of the invention is additionally advantageous since many LAP films are unusual in color and, hence, provide very unusual decorative coatings when preserved in a permanent coating as is provided by the invention.

It is, of course, well-known as disclosed, for example, in Edwards Pat. 1,946,153 to form a coating on a metal surface by employing a silicate solution. The Edwards patent discloses forming an oxide coating on aluminum, adsorbing silicate in and on the oxide coating from a silicate solution and then rinsing off the silicate solution. It is to be noted that the LAP film in accordance with this invention may be a LAP film of aluminum oxide. However, if such a LAP film is treated with a silicate solution in the manner disclosed by Edwards, a coating having wholly unsatisfactory resistance to corrosion and abrasion will result. It is clear from a reading of Edwards that the oxide coating he employs is not a LAP film but a highly adherent and continuous aluminum oxide coating such as is conventionally employed as a protective coating for aluminum which can be improved by sealing with a silicate solution. Further, Edwards employs a rinsing step and fails entirely to disclose the heating step of the instant invention which is essential to its success.

Considering the method of the invention more specifically, it is applicable broadly to all metals. Perhaps the best known method of forming the desired LAP film in accordance with the invention is attacking the metal surface with a strong acid or alkali using, for example, typical etching, cleaning and pickling reagents, such as hydrochloric, sulphuric, nitric or chromic acids or mixtures thereof, in the case of acid-attacked metals, or sodium hydroxide in the case of alkali-attacked metals. Equally satisfactory are chemical polishing solutions employing, for example, one or more of chromic, sulphuric, phosphoric or nitric acids with an added heavy metal in solution. Indeed, as indicated above, any reagent which will attack the metal to be coated may readily be employed to form the desired LAP film which is well-known to the art. Such reagents may be employed alone or together with electrolytic action.

The practically innumerable methods of forming oxides, phosphates, sulfides, chromates and the like coatings on metal surfaces can be employed to form the desired LAP film with but slight modification. Anodizing is a further example. Reference may be had for processes of forming adherent coatings to, for example, U.S. Pats. 1,900,472, 1,869,058, 1,869,041, 1,869,042 and 2,022,798 on anodizing aluminum; Chemical Abstracts, vol. 33, column 6725 for anodizing copper and brass; French Pat. 831,593 (1938) for anodizing magnesium; and Russian Pat. 51,488 (1937) for anodizing steel. Generally, any substantial change from the ideal conditions which are known to produce adherent anodized coatings, such as those in the foregoing references will result in producing an oxide LAP film as is well known to the art. Thus, for example, if the temperature, pH, time of treatment or current density are substantially above the maximum recommended for production of a conventional adherent oxide coating, a LAP film will result.

For example, anodizing of aluminum is done commercially throughout most of the world, based on the following:

Electrolyte: 15% by weight of 66° Bé. $H_2SO_4$
Temperature: About 21° C.
Anodizing time: From about 10 minutes to about 60 minutes
Current density: Either direct or alternating of about 10 to 15 amperes per sq. ft. of aluminum surface area This forms an adherent dense coating. By altering the temperature to 35° C. and anodizing for 60 minutes a LAP film is formed.

Substituting other electrolytes such as, for example, a 5% solution of oxalic acid, at say 40 volts at 30° C. yields a fairly dense coat, but by raising the temperature to about 60° C. yields a LAP film.

A wide variety of other oxide coating methods are well-known to the art. By way of example, reference may be had to the following which are incorporated herein by reference: Metal Coloring and Finishing by Hugo Krause, published by Chemical Publishing Co., Inc., Brooklyn, N.Y., 1938; Chemical Formulary by Bennett, Vol. III, pp. 217–221, Vol. IV, p. 9, Vol. VI, p. 210 for oxidizing copper and its alloys; and Vol. III, pp. 218–222 and Vol. VI, p. 22 for oxidizing silver; and Vol. III, p. 217, Vol. VI, p. 223, and Vol. I, p. 97 for oxidizing zinc. By way of further example, reference may be had to U.S. Pat. 2,250,473 for oxidizing magnesium. Here again substantial variations in the conditions set forth for the oxidation reactions and normally employed to make adherent coatings will produce the LAP film desired as is well-known to the art.

By way of still further example, the LAP film may be produced by variations of the numerous chemical film forming and electrochemical plating processes with variations in the generally used conditions such as concentrations, temperatures, current density, pH or time of treatment such as to avoid depositing an adherent metal coat.

A typical suitable immersion solution for chemical film forming will contain a fluosilicate such as sodium or zinc fluosilicate and a heavy metal salt such as, for example, copper sulfate. Reference may be had by way of further examples to the following patents, the disclosures of which are incorporated herein by reference:

U.S. 1,045,718 (1912) on aluminum
U.S. 1,594,061 (1926) on aluminum
U.S. 2,233,410 (1941) on aluminum
U.S. 2,272,777 (1942) cadmium on copper, brass or iron
U.S. 2,219,977 (1940) copper, cobalt or nickel on zinc
U.S. 1,607,676 (1926) Ni, Co, Mn, Fe, Cr or Zn on Al
U.S. 1,723,067 (1929) various coatings on iron, steel, tin, aluminum, lead or magnesium Chemical conversion coatings may be employed. For example, chromate conversion coatings may be employed with metals such as Al, Zn or Cd to provide orange colored LAP films while molybdate solutions can be used on Al, Zn, Cd, steel or stainless steel to provide gray to black LAP films.

As discussed above, the prior art references referred to and incorporated herein by reference give the conditions for forming adherent metal coatings. It is well known to the art that if these conditions are substantially departed from, a LAP film such as desired in accordance with this invention, will be formed.

Particle dispersions in a carrier liquid, preferably water, may also be employed to form the LAP film. Colloidal dispersions may be employed using particles in the range of from 0.001 to 0.1 micron. Typical particles are particles of pigments such as carbon black, titanium dioxide, Alizarine Red, Toluidine Red, chromium oxide green, antimony oxide, red oxide and phthalocyanine green; of carbon or graphite; or of resins such as a polyolefin, for example, polyethylene, an alkyd resin, neoprene, a phenolic resin such as phenol formaldehyde, rosin, a vinyl resin, such as polyvinyl acetate, and acrylic resins, such as methyl methacrylate.

The dispersions are applied to the surface to be coated and the carrier liquid such as water evaporated leaving the desired LAP film. In the case of these dispersions, surfaces of substrates other than metal may be used limited only in that they must be able to resist being damaged by the selected heat conditions of the silicate procedure, it being understood that materials which would be damaged if the upper portion of the temperature range were used may still be used if not damaged in a lower portion of the temperature range. Exemplary are the above discussed dispersions applied to leather, wood, synthetic resins, glass, ceramics and the like.

After the desired LAP film is formed on the selected substrate surface (taking metal as the exemplary substrate), an aqueous silicate solution is applied for example by spraying, dipping or flow coating. An alkali metal silicate, preferably sodium or potassium silicate, will be employed. The molecular ratio of $SiO_2$ to $M_2O$ (where $M_2O$ is the alkali metal oxide) will be in the range of from about 4:1 to 1:2, advantageously from about 4:1 to 2:1. The ratio should be such that the alkali silicate will not attack appreciably, during the treatment, the metal being coated. The concentration of the alkali metal silicate present in the aqueous solution will be in the range of from about 0.1% by weight of silicate to an amount sufficient to saturate the solution with the silicate. The temperature of application has been found to be unimportant. If desired a wetting agent such as, for example, sodium lauryl sulphate or diamyl sodium sulfosuccinate or a sodium alkyl toluene sulfonate may be added but is not essential.

The excess silicate solution is drained off and the thus coated metal is dried and then heated.

The conditions involved in drying and heating will be made clearer from the following:

After the excess of the silicate solution is drained off, what is first desired is a coating which is dry to the touch, and this initial drying may be effected either at ordinary room temperatures or at elevated temperatures to speed up the drying procedure. Depending upon the concentration of the wet silicate, its boiling temperature will range somewhat above 100° C. The maximum temperature to be used in drying is set by the ebullition point of the silicate solution. The silicate solution is viscous, and if ebullition occurs the steam bubbles formed as the drying proceeds may form minute pits in the surface, preventing it from being smooth and glossy such as is desired. Such pitting will generally be quite irregular and unsatisfactory even to produce a matte surface. On the other hand, if the drying temperature is kept below the ebullition point quiet evaporation of water from the surface of the film takes place leaving, at this stage, a smooth coating. While, thus, a permissible drying temperature may range to a few degrees above 100° C., because of difficulty of accurate temperature control it is generally desirable that the temperature should be maintained safely at or below 100° C., though slightly higher temperatures are permissible if careful control is exercised to prevent ebullition.

At this stage of drying, the silicate will be too soluble to provide a satisfactory coating, and what is herein referred to as a heating step is then employed. After the drying as just described produces a coating which is dry to the touch, raising the temperature will not deteriorate the smoothness of the coating by ebullition; but rather, water of hydration may be driven off in quiet fashion without disturbing the smooth continuity of the coating. The dehydration will occur in a fashion which is a function of temperature and time. Actually, effective dehydration will even occur at a temperature as low as 102° C. if the subjection to this temperature is sufficiently long. However, from a practical standpoint the heating for dehydration is desirably carried out at, at least, 105° C. and more desirably in a range running upwards of this to minimize the time required. Even at 102° to 105° C., given sufficient time, dehydration will ultimately occur to a point of rendering satisfactorily insoluble the silicate coating. By heating at a temperature of, for example, 106° for 10 minutes, a coating originally dry to the touch will loose water to the extent of about 15% of its weight, which loss corresponds to a satisfactory degree of insolubility in water. However, even relatively little rise of temperature above this will produce satisfactory insolubility in substantially shorter times. For example, at 110° C. drying produced a loss of water of about 12% of the coating weight in 1 minute and a 15% loss in 5 minutes. Heating at 120° C. for 1 minute produced a 17% loss of weight of the coating, and at this temperature there was little further loss by extending the heating to 10 minutes, with such a loss of water there being what might be considered an equilibrium condition reached at this temperature.

While the dehydration of amounts just indicated produces satisfactory insolubility for many purposes, such as for coatings which may be subjected to washing rather infrequently, such as decorative objects, for other uses, such as exterior panels exposed to the weather or food dishes frequently washed, a higher degree of insolubility may be desired. There may be cited, as an example, heating at 165° C. In this case, the loss of weight due to dehydration amounted to 24% after 1 minute and 27% after 10 minutes, and this dehydration results in a quite insoluble coating.

As will be seen from the above, carrying out the heating to promote insolubility at elevated temperatures is primarily to save time or to secure quite high and extraordinary insolubility. Since from a practical standpoint, manipulations can hardly be carried out in less than 1 minute, a temperature of 165° C. is all that is necessary. Higher temperatures have no special advantages (though there may be some increase in ultimate insolubility) but are rather wasteful of heat. Quite high temperatures may have to be avoided because the dehydration may occur so fast that massive liberation of steam may cause intumescence which may spoil the appearance of the coating, just as ebullition would under boiling conditions while the coating was still wet. Intumescence is particularly liable to occur when the silicate coating is thick. Furthermore, high temperatures may produce brittleness particularly when the silicate contains a high percentage of $SiO_2$. Generally, it might be said that a maximum desirable temperature would be 375° C. even in the case of metals and LAP films which would withstand such a temperature. Temperatures over 425° produce a substantial risk of damage.

In all cases the maximum temperature will be selected to avoid damage to the selected substrate or to the LAP coating (e.g. when it contains a dye) and to avoid intumescence. The heating will generally be carried out for from about one minute to about thirty minutes. While there is no upper limit to the heating time, very little additional benefit is achieved by heating for over thirty minutes.

If a color other than the natural color of the LAP film formed by anodizing, other oxidizing or by a chromate conversion is desired, the LAP film may be colored. A wide variety of coloring materials may be employed such as, for example, a dye. Exemplary are Alizarine dyes, complex metallic dyes, indigo dyes and azo dyes. Any of the dyes well-known for use in coloring anodizing coatings may be used such as those dyes disclosed in Finishing of Aluminum by Wernick and Pinner, 1956, published by Robert Draper, Ltd. of Middlesex, England, chapter 10 of which is incorporated herein by reference. Other conventional coloring techniques may be employed such as, for example, treating the LAP film with an aqueous solution of a permanganate. When dyes are employed, they should be set with a nickel acetate solution before treatment with the alkali silicate, as is known to the art, to prevent the silicate from adversely affecting the dye. An exemplary sealing treatment is with 5 grams of nickel acetate in a liter of water at pH 5.5 at 82° C. for 2 minutes.

The invention will be further clarified by the following examples in which the panels used are sufficiently clean to be water-wettable. The coated panels are wetted with a silicate and "dry" means dry to the touch:

EXAMPLE I (Etching)

A clean aluminum panel of alloy No. 2024ST (which is a high copper alloy) is placed in an aqueous solution of 5% NaOH at 150° F. for 5 minutes. A violent attack takes place, first forming a light colored gray LAP film and then getting darker with time, until a black LAP film is formed.

The thus coated panel is dipped in an aqueous silicate solution made up from 50% by volume of an aqueous sodium silicate solution (having a ratio of $Na_2O:SiO_2$ of 1:3.75; Bé. 35°) and 50% by volume of water at a temperature of 21° C. and then removed and air dried at 21° C. The dried panel is baked at 260° C. for 15 minutes. The finished panel is black.

EXAMPLE II (Pickling)

A clean stainless steel panel (18–8; type 302) is held in a 30% solution of $H_2SO_4$ at 65° C. for one minute after gassing starts and then rinsed with water.

The thus coated panel is dipped in an aqueous silicate solution made up from 50% by volume of an aqueous potassium silicate solution (having a ratio of $K_2O:SiO_2$ of 1:3.92; Bé. 29.9°) and 50% by volume of water at a temperature of 21° C. for 1 minute and then removed and dried at 21° C. The dried panel is baked at 260° C. for 15 minutes. The finished panel is light gray.

EXAMPLE III (Etching)

A clean aluminum panel of alloy No. 3003 (which contains manganese) is submerged in a 4% NaOH solution until a LAP film is formed.

The thus coated panel is dipped in an aqueous silicate solution made up from 50% by volume of an aqueous potassium silicate solution (having a ratio of $K_2O:SiO_2$ of 1:3.92; Bé. 29.9°) and 50% by volume of water at a temperature of 21° C. and then removed and dried at 21° C. The dried panel is baked at 260° C. for 15 minutes. The finished panel is light gray.

EXAMPLE IV (Pickling)

A clean copper sheet is dipped into the following bath until a LAP film is formed (2 minutes) and then rinsed with water:

Sulfuric acid (93%): 1 gallon
Nitric acid (70%): 1 gallon
Zinc sulfate: 2 lbs.
Temperature: 25° C.

The thus coated panel is dipped in an aqueous silicate solution made up from 50% by volume of an aqueous sodium silicate solution (having a ratio of $Na_2O:SiO_2$ of 1:3.75; Bé. 35°) and 50% by volume of water at a temperature of 21° C. and then removed and dried at 21° C. The dried panel is baked at 425° C. for 15 minutes The finished panel is dull red.

EXAMPLE V (Chemical forming)

A clean panel of low carbon steel is contacted with an aqueous solution containing:

2 grams of sodium fluosilicate
2 grams of cupric sulfate
2 grams of sodium carbonate
2 grams of sodium molybdate
1 liter of water for 5 minutes at 25° C. and then rinsed with water. A brown-black LAP film is formed.

The thus coated panel is dipped in an aqueous silicate solution made up from 80% by volume of an aqueous sodium silicate solution (having 50 grams of $Na_2:SiO_2$ (1:1) in a liter of water); and 20% by volume of water at a temperature of 21° C. and then removed and dried at 90° C. The dried panel is baked at 140° C. for 15 minutes. The finished panel is brown-black.

EXAMPLE VI (Chromate conversion)

A clean panel of zinc is contacted with an aqueous solution containing:

100 grams of chromic acid ($CrO_3$)
60 mls. of (90%) formic acid
1 liter of water at 38° C. for 1 minute and then rinsed with water. An orange colored LAP film is formed.

The thus coated panel is dipped in an aqueous silicate solution made up from 50% by volume of an aqueous potassium silicate solution (having a ratio of $K_2O:SiO_2$ of 1:3.92; Bé. 29.9°) and 50% by volume of water at a temperature of 21° C. and then removed and dried at 21° C. The dried panel is baked at 260° C. for 15 minutes. The finished panel is orange.

EXAMPLE VII (Chemical conversion)

A clean magnesium casting is contacted with an aqueous solution of:

100 grams of chromic acid ($CrO_3$)
60 mls. of 90% formic acid
1000 mls. of water (to make)
2 grams of zinc fluosilicate
38° C.—5 seconds and then rinsed with water.

The resultant LAP film is a deep orange color.

The thus coated panel is dipped in an aqueous silicate solution made up from 50% by volume of an aqueous sodium silicate solution (having a ratio of $Na_2O:SiO_2$ of 1:3.75; Bé. 35°) and 50% by volume of water at a temperature of 21° C. for 1 minute and then removed and dried at 21° C. The dried panel is baked at 260° C. for 15 minutes. The finished panel is deep orange.

EXAMPLE VIII (Chemical conversion)

A clean panel of lead is contacted with a solution of:

100 grams of chromic acid
60 mls. of 90% formic acid
1000 mls. of water (to make)
38° C.—for 1 minute and then rinsed with water.

The resultant LAP film is a deep yellow.

The thus coated panel is dipped in an aqueous silicate solution made up from 40% by volume of an aqueous sodium silicate solution (having a ratio of $Na_2O:SiO_2$ of 1:3.75; Bé. 35°) and 60% by volume of water at a temperature of 21° C. and then removed and dried at 21° C. The dried panel is baked at 260° C. for 15 minutes. The finished panel is deep yellow.

EXAMPLE IX (Chemical conversion)

A clean panel of tin-plate on steel is contacted with an aqueous solution of:

2 grams of potassium permanganate at 100° C. for 5 minutes and then rinsed with water and results in a light gold color LAP film.

The thus coated panel is dipped in an aqueous silicate solution made up from 80% by volume of an aqueous sodium silicate solution (having a ratio of $Na_2O:SiO_2$ of 1:3.75; Bé. 35°) and 20% by volume of water at a temperature of 21° C. and then removed and dried at 21° C. The dried panel is baked at 160° C. for 15 minutes. The finished panel is light gold.

EXAMPLE X (Chemical conversion)

A clean stainless steel panel (type 302) of composition identified as "18–8 type 302" is contacted with a solution of:

2 grams of potassium permanganate
5 mls. of 67% nitric acid
1 liter of water at 55° C. for 5 minutes and rinsed with water. The resultant LAP film is orange colored.

The thus coated panel is dipped in an aqueous silicate solution made up from 80% by volume of an aqueous sodium silicate solution (having a ratio of $Na_2O:SiO_2$ of 1:3.75; Bé. 35°) and 20% by volume of water at a temperature of 21° C. and then removed and dried at 21° C. The dried panel is baked at 180° C. for 15 minutes. The finished panel is orange.

EXAMPLE XI (Chromate conversion)

A chromate conversion coating is formed on the surfaces of an aluminum panel by contacting the clean surfaces with a solution of the following formula:

10 grams of sodium dichromate
2 grams of chromic acid
1 gram of sodium fluosilicate
1 gram of sodium fluoborate
0.5 gram of cupric sulfate
1 liter of water The contact is for 5 minutes at 30° C. The LAP film is rinsed with water.

The thus coated panel is dipped in an aqueous silicate solution made up from 50% by volume of an aqueous silicate solution (having a ratio of $Na_2O:SiO_2$ of 1:3.75; Bé. 35°) and 50% by volume of water at a temperature of 21° C. and then removed and dried at 21° C. The dried panel is baked at 260° C. for 15 minutes. The finished panel is blue.

EXAMPLE XII (Chemical conversion)

A clean cold rolled steel panel is immersed in a solution of:

1 gram of sodium fluosilicate
1 gram of potassium permanganate
1 liter of water at 24° C. for 2 minutes and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°), 20% by volume of water and 0.1% by weight of a wetting agent (sodium dodecyl toluene sulfonate) at a temperature of 24° C. and then removed and dried and then baked at 180° C. for 10 minutes. The finished panel is golden brown.

EXAMPLE XIII (Chemical conversion)

A clean aluminum panel is immersed in an aqueous solution of:

1 gram of zinc fluosilicate
1 gram of sodium fluosilicate
1 gram of copper sulfate
1 liter of water at 24° C. for 30 seconds and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°), 20% by volume of water and 0.1% by weight of a wetting agent (sodium dodecyl toluene sulfonate) at a temperature of 24° C. and then removed and dried and then baked at 180° C. for 10 minutes. The finished panel is dark green.

EXAMPLE XIV (Chemical conversion)

A clean zinc panel is immersed in a solution of:

1 gram of sodium fluosilicate
1 gram of nickel sulfate
0.2 gram of copper sulfate
1 liter of water at 24° C. for 4 minutes and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°) and 20% by volume of water at a temperature of 24° C. and then removed and dried and then baked at 180° C. for 10 minutes. The finished panel is grayish green.

EXAMPLE XV (Chemical conversion)

A clean steel panel is immersed in a solution of:

5 grams of sodium fluosilicate
1 gram of zinc fluosilicate
1 gram of copper sulfate
1 liter of water at 24° C. for 1 and ½ minutes and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°), 20% by volume of water and 0.1% by weight of a wetting agent (sodium dodecyl toluene sulfonate) at a temperature of 24° C. and then removed and dried, and is then baked at 120° C. for 20 minutes. The finished panel is dark red.

EXAMPLE XVI (Chemical conversion)

A clean aluminum panel is immersed in a solution 4 grams of zinc fluosilicate
0.5 gram of copper sulfate
1 liter of water at 24° C. for 1 and ½ minutes and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°) and 20% by volume of water at a temperature of 24° C. and then removed and dried and then baked at 180° C. for 10 minutes. The finished panel is blue.

EXAMPLE XVII (Chemical conversion)

A clean steel plate is immersed in a solution of:

10 grams of zinc fluosilicate
1 gram of copper sulfate
1 liter of water at 24° C. for 2 minutes and then rinsed with water.

The thus treated panel is dipped in an aqueous silicate solution made up from 80% by volume of an aqueous potassium silicate solution (having a ratio of $SiO_2:K_2O$ of 3.92:1 and a Bé. of 29.9°) and 20% by volume of water at a temperature of 24° C. and then removed and dried and then baked at 180° C. for 10 minutes. The finished panel is black.

EXAMPLE XVIII (Chemical oxidation of aluminum)

A cleaned aluminum panel is treated in an aqueous solution of:

6 ozs./gallon of soda ash
2 ozs./gallon of sodium chromate
2 ozs./gallon of sodium hydroxide The time of treatment is 5 minutes at a temperature of 100° C. It is then removed, allowed to drain and rinsed. It is then immersed in a dyebath made up of 0.5 g./l. of Alizarine Blue S.A.P. (color index No. 63010) at 66° C. for 5 minutes and rinsed with water.

After dyeing, the dye is "set" by immersing the panel in an aqueous solution of 5 g./l. of nickel acetate at a pH of 5.5 (at 25° C.) at about 85° C., for about 2 minutes or more—removed, rinsed and dried—and then provided with a silicate film following the procedure of Example XVII.

EXAMPLE XIX (Anodizing of aluminum)

A cleaned aluminum panel is treated anodically in an aqueous solution of 15% (wt.) of $O_2SO_4$ at 35° C. for 60 minutes at 15 amperes per square foot of aluminum surface. It is then rinsed and then subjected to an aqueous dyebath well known in the art for dyeing anodized aluminum, e.g. 0.5 g./l. of Alizarine Red S Color Index No. 58005 at pA 5.8 (at 25° C.) for 5 minutes at 60° C. it is then rinsed and immersed in an aqueous solution of 5 g./l. of nickel acetate at a pH of 5.5 (at 25° C.) for about 5 minutes at about 85° C. and rinsed.

It is then treated with an aqueous silicate solution based on 10 parts of potassium silicate to 10 parts of water, the silicate mol ratio of $K_2O:SiO_2$ of 1:3.92 and silicate Bé. of 28°. The coat is then air-dried to the touch and finally baked at 120° C. for 10 minutes.

EXAMPLE XX (Colloidal dispersion of graphite on steel)

A cleaned steel panel is immersed in a colloidally dispersed graphite in water of a water-like consistency.

It is allowed to air-dry and then sprayed with a silicate solution consisting of 10 parts by volume of a potassium silicate ($K_2O$ to $SiO_2$ is 1:3.92 mol) and 10 parts by volume of water. It is allowed to drain and air-dry to the touch. It is then baked at 200° C. for 5 minutes.

EXAMPLE XXI (Colloidal dispersion of colored pigment)

Chromium oxide green pigment Color Index No. 77288 dispersed in water is thinned to a water-like consistency with water and applied to a cleaned aluminum panel, drained and dried. It is then coated with a silicate film following the procedure of Example XX.

EXAMPLE XXII (Colloidal dispersion of colored pigment on leather)

Pthalocyanine Green (No. 6012 by Harshaw Chemical Co.) Color Index No. 74265 dispersed in water is thinned to a water-like consistency with water and applied to a clean piece of leather which is then drained and dried to leave a LAP film of pigment which is then treated with a silicate solution following the procedure of Example XX with the exception that a baking temperature of 100° C. is employed for 10 minutes.

EXAMPLE XXIII (Colloidal dispersion of colored pigment on wood)

The procedure of Example XXII is employed with the sole exception that a panel of wood is substituted for the leather.

EXAMPLE XXIV (Colloidal dispersion of colored pigment on chipboard)

The procedure of Example XXII is repeated with the exception that a panel of chipboard is substituted for the leather.

What is claimed is:

1. The method of forming on a surface a decorative coating resistant to corrosion and abrasion comprising forming a loosely adherent porous film of particles on the surface, applying a silicate solution to the film coated surface, drying the silicate-film coating at a temperature below the boiling point of the silicate solution and heating the dried silicate-film coating to insolubilize the silicate.

2. The method of claim 1 in which the heating is carried out at a temperature in the range from slightly above 100° C. to 425° C.

3. The method of claim 1 in which the heating is carried out at a temperature in the range of from about 120° C. to about 375° C.

4. The method of claim 1 in which the surface is a metal surface and the film is formed by anodizing.

5. The method of claim 4 in which the metal is aluminum.

6. The method of claim 1 in which the surface is a metal surface and the film is formed by etching the metal surface.

7. The method of claim 1 in which the particles are metal oxide.

8. The method of claim 1 in which the particles are chromates.

9. The method of claim 1 in which the surface is a metal surface and the film is formed by electroplating.

10. The method of claim 1 in which the surface is a metal surface and the film is formed by chemical deposition.

11. The method of claim 1 in which the surface is a metal surface and the film is formed by treating the metal surface with a strong acid or alkali capable of attacking the metal surface.

12. The method of claim 1 in which the film is formed by depositing particles dispersed in a liquid carrier.

References Cited

UNITED STATES PATENTS

| | | | |
|---|---|---|---|
| 1,540,766 | 6/1925 | Daniels et al. | 148—6.27 |
| 1,946,153 | 2/1934 | Edwards | 148—6 |
| 2,018,694 | 10/1935 | Wetherbee | 148—6 |
| 2,141,377 | 12/1938 | Chylinski | 204—58X |
| 2,157,155 | 7/1936 | Work et al. | 148—6.27X |
| 2,161,636 | 6/1939 | Rankin et al. | 204—58X |
| 2,714,066 | 7/1955 | Jewett et al. | 148—6.27X |
| 2,924,539 | 2/1960 | Arndt et al. | 117—127 |
| 3,374,155 | 3/1968 | Weber | 204—38 |
| 2,006,770 | 7/1935 | Jones | 161—207 |
| 1,982,179 | 11/1934 | Scharschu | 161—207X |
| 2,882,153 | 4/1959 | Cohn | 117—135.1X |
| 3,125,471 | 3/1964 | Conner | 148—31.5 |
| 3,208,874 | 9/1965 | Conner | 117—135.1 |
| 3,214,287 | 10/1965 | Mosna | 117—135.1X |
| 3,301,702 | 1/1967 | Ames et al. | 117—135.1 |
| 3,423,229 | 1/1969 | Kompanek et al. | 117—135.1X |

FOREIGN PATENTS

| | | | |
|---|---|---|---|
| 240,483 | 8/1960 | Australia | 148—6.27 |

JOHN H. MACK, Primary Examiner

T. TUFARIELLO, Assistant Examiner

U.S. Cl. X.R.

117—135.1; 148—6.27; 156—23; 161—207; 204—38A